US008585075B2

(12) United States Patent
Zhong

(10) Patent No.: US 8,585,075 B2
(45) Date of Patent: Nov. 19, 2013

(54) STROLLER AND SUPPORT-FRAME ADJUSTING DEVICE

(75) Inventor: Zhi-Ren Zhong, Hong Kong (CN)

(73) Assignee: Wonderland Nurserygoods Co., Ltd. (TW)

( * ) Notice: Subject to any disclaimer, the term of this patent is extended or adjusted under 35 U.S.C. 154(b) by 706 days.

(21) Appl. No.: 12/753,496

(22) Filed: Apr. 2, 2010

(65) Prior Publication Data

US 2010/0327561 A1 Dec. 30, 2010

(30) Foreign Application Priority Data

Jun. 30, 2009 (CN) .......................... 2009 1 0139639

(51) Int. Cl.
*B62B 7/14* (2006.01)
(52) U.S. Cl.
USPC .......................... 280/648; 280/643; 280/47.38
(58) Field of Classification Search
USPC .................... 280/642, 643, 647, 47.38, 47.41
See application file for complete search history.

(56) References Cited

U.S. PATENT DOCUMENTS

| | | | | |
|---|---|---|---|---|
| 5,201,535 A * | 4/1993 | Kato et al. | ....................... | 280/30 |
| 5,257,799 A * | 11/1993 | Cone et al. | ..................... | 280/642 |
| 5,676,386 A * | 10/1997 | Huang | ............................. | 280/30 |
| 5,772,279 A * | 6/1998 | Johnson, Jr. | .................. | 297/130 |
| 5,865,447 A * | 2/1999 | Huang | ............................ | 280/30 |
| 5,947,555 A * | 9/1999 | Welsh, Jr. et al. | ............. | 297/130 |
| 6,086,086 A * | 7/2000 | Hanson et al. | ................ | 280/650 |
| 6,446,990 B1 * | 9/2002 | Nania et al. | .............. | 280/47.371 |
| 6,715,783 B1 * | 4/2004 | Hanson et al. | ................ | 280/642 |
| 6,893,040 B2 * | 5/2005 | Hou et al. | ...................... | 280/642 |
| 6,923,467 B2 * | 8/2005 | Hsia | .............................. | 280/648 |
| 7,017,921 B2 * | 3/2006 | Eros | .......................... | 280/47.38 |
| 7,032,922 B1 * | 4/2006 | Lan | ............................... | 280/648 |
| 7,600,775 B2 * | 10/2009 | Chen et al. | ..................... | 280/650 |
| 7,658,399 B2 * | 2/2010 | Van Dijk | ....................... | 280/642 |
| 7,681,894 B2 * | 3/2010 | Santamaria | ................ | 280/47.38 |
| 7,686,322 B2 * | 3/2010 | Longenecker et al. | ........ | 280/642 |
| 7,694,996 B2 * | 4/2010 | Saville et al. | ................. | 280/642 |
| 7,938,435 B2 * | 5/2011 | Sousa et al. | ..................... | 280/658 |
| 8,128,119 B2 * | 3/2012 | Saville et al. | ................. | 280/648 |
| 8,240,700 B2 * | 8/2012 | Greger et al. | ................. | 280/648 |
| 8,251,382 B2 * | 8/2012 | Chen et al. | ................. | 280/47.41 |

* cited by examiner

*Primary Examiner* — Jeffrey J Restifo
(74) *Attorney, Agent, or Firm* — Rajesh Vallabh; Foley Hoag LLP

(57) ABSTRACT

A stroller includes a stroller frame having a mounting frame portion, a support frame connected pivotally to the mounting frame portion for supporting a seat, and a support-frame adjusting device operable to adjust an angle between the support frame and the mounting frame portion. The support-frame adjusting device includes an elongated supporting member disposed pivotally on one of the support frame and the mounting frame portion and having first and second engagement portions, and a positioning member locked releaseably at a selected one of the first and second engagement portions. When released from the selected one of the first and second engagement portions, the positioning member is movable to engage the other one of the first and second engagement portions to thereby change the angle between the supporting member and the mounting frame portion and, thus, the inclination angle of the seat.

36 Claims, 14 Drawing Sheets

STROLLER AND SUPPORT-FRAME ADJUSTING DEVICE

CROSS-REFERENCE TO RELATED APPLICATION

This application claims priority of Chinese Application No. 200910139639.7, filed on Jun. 30, 2009.

BACKGROUND OF THE INVENTION

1. Field of the Invention

This invention relates to a stroller, and more particularly to a stroller connectable with a car safety seat.

2. Description of the Related Art

When traveling in an automobile, a small child needs to be placed on a car safety seat to reduce injuries resulting from a traffic accident. Furthermore, a stroller is required to transport the small child after it leaves from the automobile. At this time, the car safety seat is idle, and occupies a relative large space. Further, if the small child is asleep during movement thereof from the car safety seat onto the stroller, it may be awaken.

To resolve the above problems, many strollers connectable with car safety seats have been proposed, e.g., disclosed in U.S. Pat. Nos. 5,772,279, 5,865,447, and 5,947,555. Therefore, a car safety seat can be moved directly from an automobile onto such a stroller. However, currently available strollers are constructed such that a car safety seat can be connected therewith at only one inclination angle. In actual use, this causes a discomfort feeding to the small child or inconvenience on the part of the person taking care of the small child.

SUMMARY OF THE INVENTION

An object of this invention is to provide a stroller that is connectable with a car safety seat such that the inclination angle of the car safety seat is adjustable.

Another object of this invention is to provide a stroller that includes a support frame that is disposed pivotally on a stroller frame and that supports a car safety seat, such that the inclination angle of the car safety seat is adjustable.

According to an aspect of this invention, there is provided a stroller adapted to be connected with a seat, the stroller comprising:

a stroller frame having a mounting frame portion;

a support frame connected pivotally to the mounting frame portion of the stroller frame and adapted to permit the seat to be mounted removably thereon; and a support-frame adjusting device operable to adjust an angle between the support frame and the mounting frame portion of the stroller frame and including an elongated supporting member disposed pivotally on one of the support frame and the mounting frame portion and having a first engagement portion and a second engagement portion that are spaced apart from each other along a longitudinal direction of the supporting member, and a positioning member extending through and locked releaseably at a selected one of the first and second engagement portions of the supporting member;

wherein, when released from the selected one of the first and second engagement portions of the supporting member, the positioning member is movable to and thus locked releaseably at the other one of the first and second engagement portions of the positioning member to change the angle between the supporting member and the mounting frame portion and, thus, the inclination angle of the car safety seat.

According to another aspect of this invention, there is provided a support-frame adjusting device adapted to adjust an angle between a support frame and a mounting frame portion of a stroller frame, the support frame being connected pivotally to the mounting frame portion, the support-frame adjusting device comprising:

an elongated supporting member disposed pivotally on one of the support frame and the mounting frame portion and having a first engagement portion and a second engagement portion that are spaced apart from each other along a longitudinal direction of the supporting member, and a positioning member extending through and locked releaseably at a selected one of the first and second engagement portions of the supporting member;

wherein, when released from the selected one of the first and second engagement portions of the supporting member, the positioning member is movable to and thus locked releaseably at the other one of the first and second engagement portions of the positioning member to change the angle between the supporting member and the mounting frame portion.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
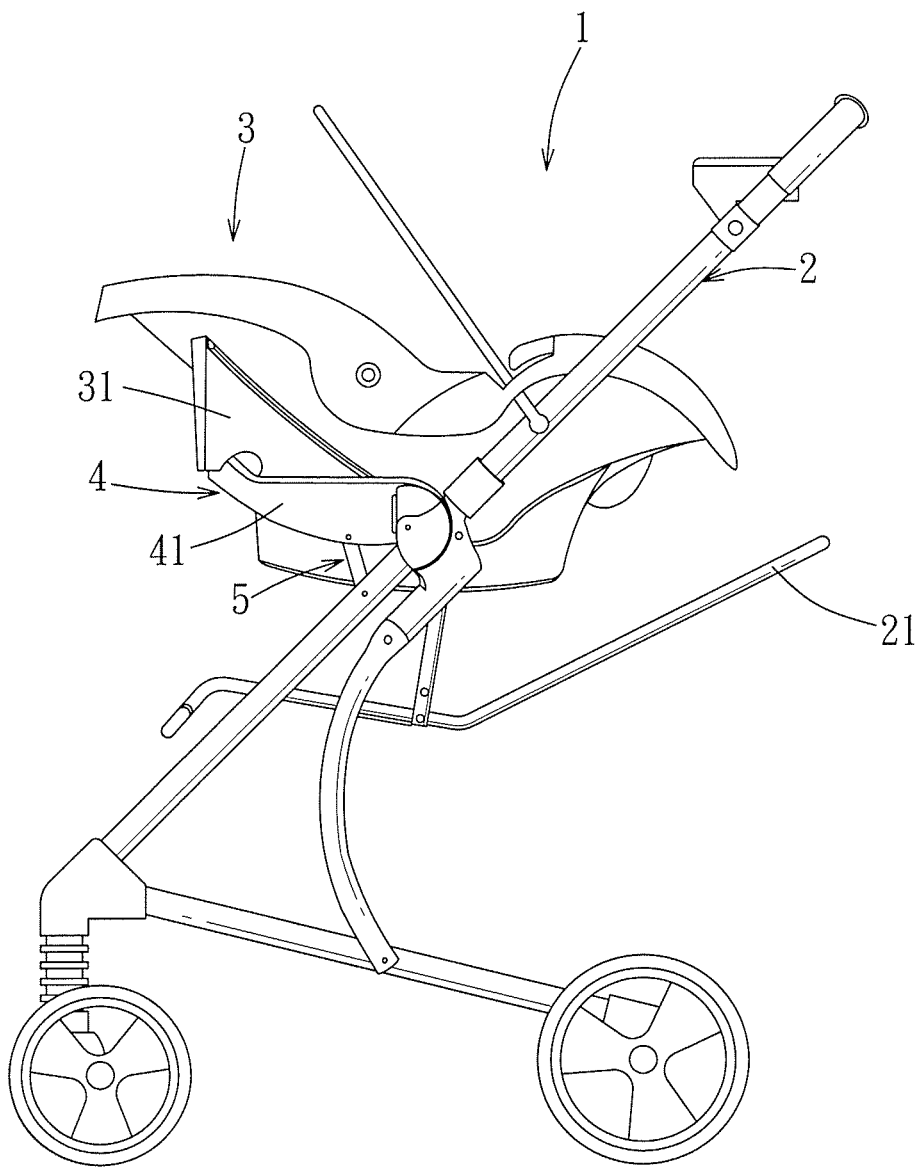
FIG. 1 is a side view of the first preferred embodiment of a stroller according to this invention.

Before the present invention is described in greater detail in connection with the preferred embodiments, it should be noted that similar elements and structures are designated by like reference numerals throughout the entire disclosure.

Referring to FIG. 1, the first preferred embodiment of a stroller 1 according to this invention includes a stroller frame 2, a support frame 4, and a support-frame adjusting device 5, and permits a car safety seat 3 to be mounted removably on the stroller frame 2 and the support frame 4. The car safety seat 3 can be replaced with a bassinet or any other suitable seat permitting sitting of a small child. Typically, a pad (not shown) is disposed on a seat-supporting frame 21 so as to allow a child to be seated thereon when the stroller 1 is not connected with the seat 3. In this case, the support frame 4 serves as an armrest.

The stroller frame 2 has a mounting frame portion 22.

The support frame 4 is U-shaped, and is used to support the seat 3 in such a manner to abut against a back surface of the seat 3. The back surface of the seat 3 is formed with a downwardly open position-limiting body 31 engaging the support frame 4.

The support frame 4 has two side arms 41 each connected pivotally to the mounting frame portion 22 of the stroller frame 2 at an end thereof. For convenience of illustration, only one of the side arms 41 is described hereinafter.

The side arm 41 of the support frame 4 forms an angle with respect to the mounting frame portion 22 of the stroller frame 2. The support-frame adjusting device 5 is operable to adjust the angle, i.e., to pivot the support frame 4 upwardly or downwardly relative to the mounting frame portion 22 of the stroller frame 2 to thereby adjust the seat 3 to an inclined position or an upright position.

Figure 2:
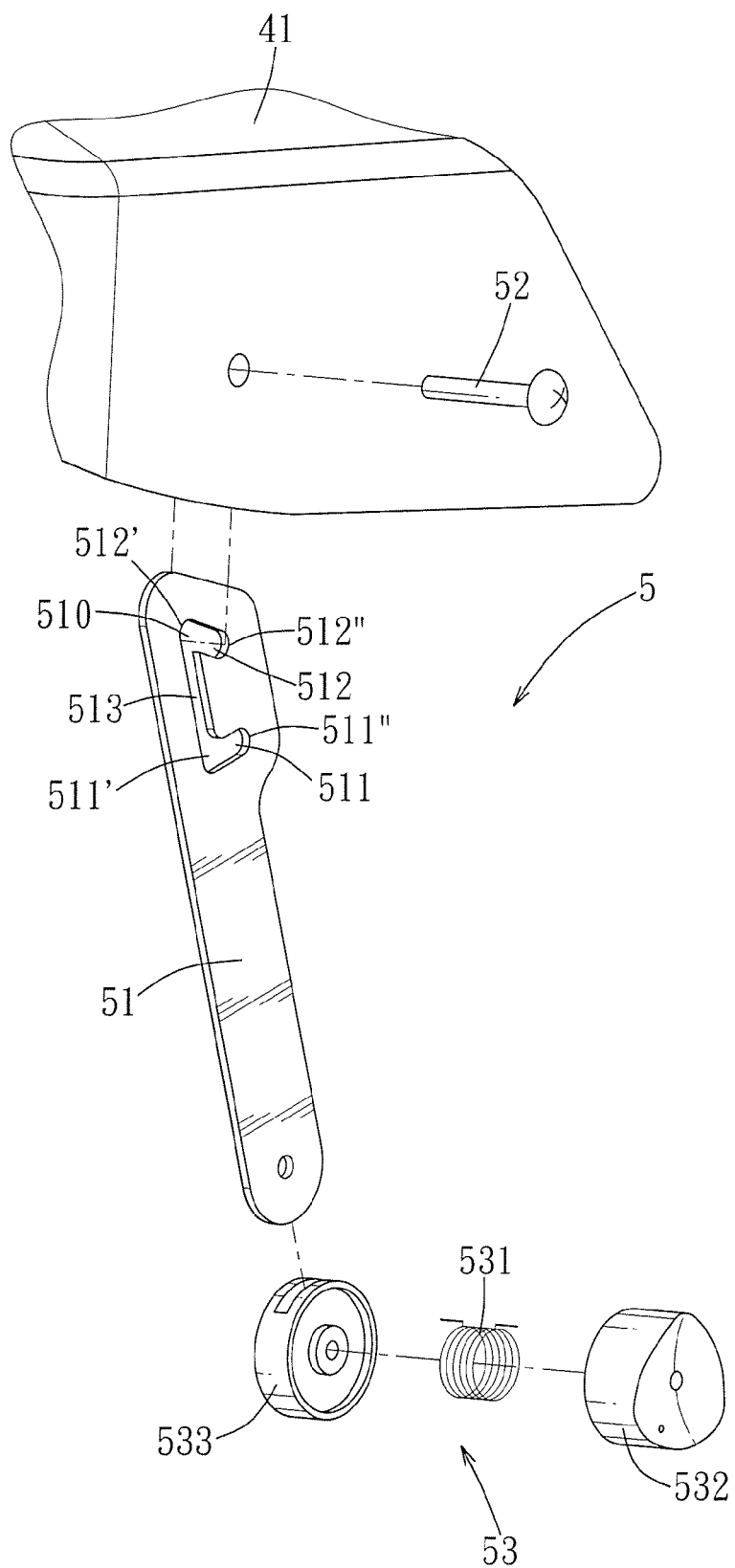
FIG. 2 is an exploded perspective view of a support-frame adjusting device of the first preferred embodiment.
Figure 3:
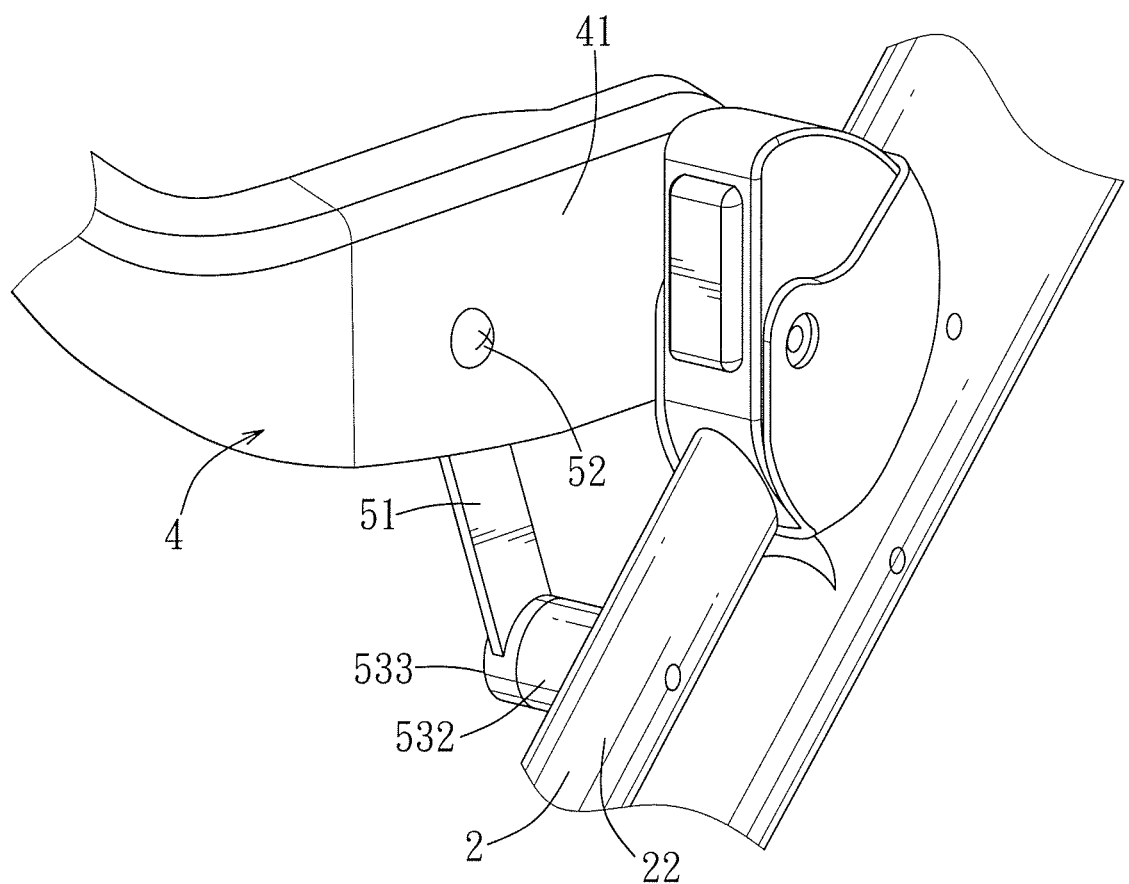
FIG. 3 is an assembled perspective view of the support-frame adjusting device of the first preferred embodiment.
Figure 4:
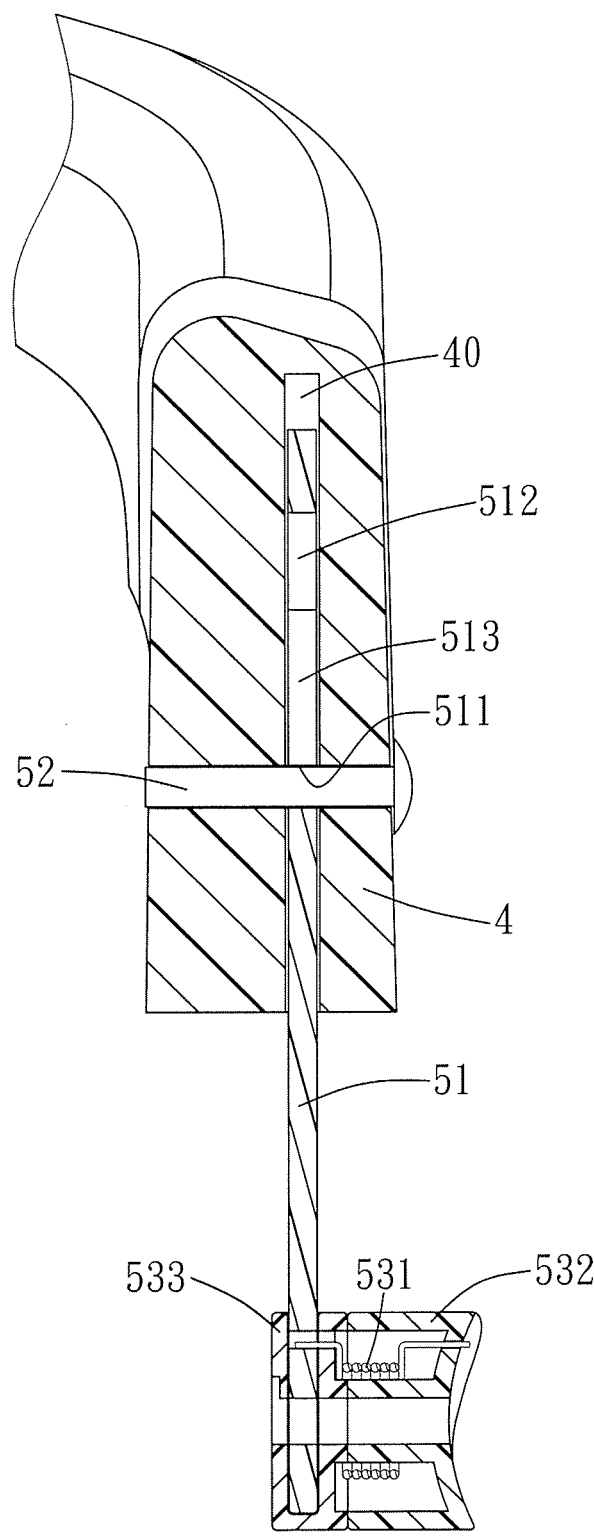
FIG. 4 is a sectional view of the support-frame adjusting device of the first preferred embodiment.

With further reference to FIGS. 2, 3, and 4, the support-frame adjusting device 5 includes a supporting member 51, a positioning member 52, and a resilient unit 53. The supporting member 51 is elongated. In this embodiment, the supporting member 51 has a lower end disposed pivotally on the mounting frame portion 22 of the stroller frame 2, and an upper end portion extending into a blind hole 40 in the support frame 4. The upper end portion of the supporting member 51 disposed within the blind hole 40 in the support frame 4 has a first engagement portion 511 and a second engagement portion 512 that is disposed above the first engagement portion 511. The first and second engagement portions 511, 512 are spaced apart from each other along a longitudinal direction of the supporting member 51. In this embodiment, the supporting member 51 is formed with a Generally U-shaped slot 510 therethrough. The Generally U-shaped slot 510 has a pair of first and second side slot portions constituting respectively the first and second engagement portions 511, 512, and a lengthwise slot portion 513 connected between the first and second engagement portions 511, 512. Each of the first and second engagement portions 511, 512 has an open end 511', 512' and a closed end 511", 512" that are opposite to each other. The open and closed ends 511', 511" of the first engagement portion 511 are aligned respectively with the open and closed ends 512', 512" of the second engagement portions 512. The lengthwise slot portion 513 is connected between the open ends 511', 512' of the first and second engagement portions 511, 512.

In this embodiment, the positioning member 52 is configured as a pin, and extends through the support frame 4 and the supporting member 51. The resilient unit 53 is disposed between the lower end of the supporting member 51 and the mounting frame portion 22 of the stroller frame 2, and includes a torsion spring 531, a hollow spring seat 532 disposed fixedly on the mounting frame portion 22 of the stroller frame 2 for receiving the torsion spring 531, and an end cap 533 disposed fixedly on the lower end of the supporting member 51. The torsion spring 531 has one end fastened to the spring seat 532, and the other end fastened to the end cap 533. The supporting member 51 is biased by the torsion spring 531 to pivot relative to the mounting frame portion 22 of the stroller frame 2 in a rotational direction (R) (see FIG. 7) so as to move the positioning member 52 toward the closed end 511", 512" of a selected one of the first and second engagement portions 511, 512.

In an alternative arrangement, the upper end of the supporting member 51 is disposed pivotally on the mounting frame portion 22 of the stroller frame 2, the first and second engagement portions 511, 512 are disposed at a lower end portion of the supporting member 51, the positioning member 52 is disposed fixedly on the mounting frame portion 22 of the stroller frame 2, and the resilient unit 53 is disposed between the supporting member 51 and the support frame 4. Alternatively, the positions of the positioning member 52 and an assembly of the first and second engagement portions 511, 512 may be exchanged. That is, the positioning member 52 is disposed at the supporting member 51, and the first and second engagement portions 511, 512 are disposed at the support frame 4.

Figure 5:
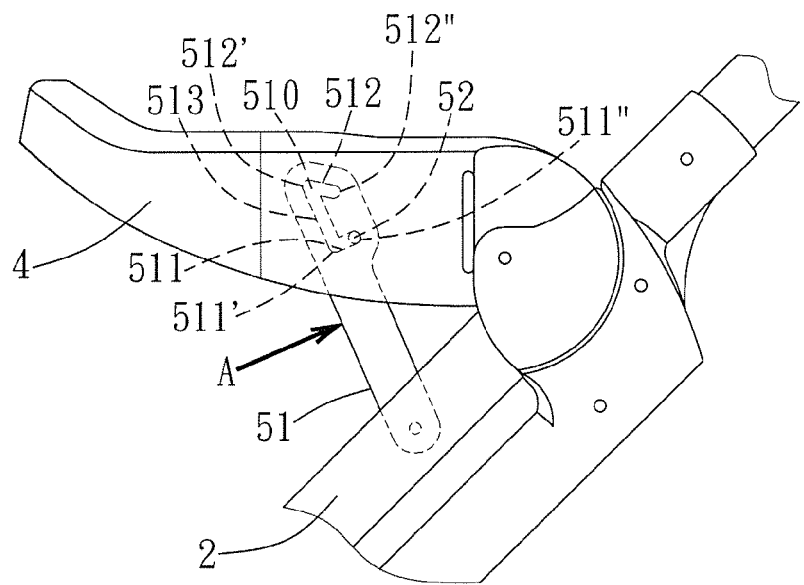
FIGS. 5 to 7 are schematic views illustrating operation of the support-frame adjusting device of the first preferred embodiment.
Figure 6:
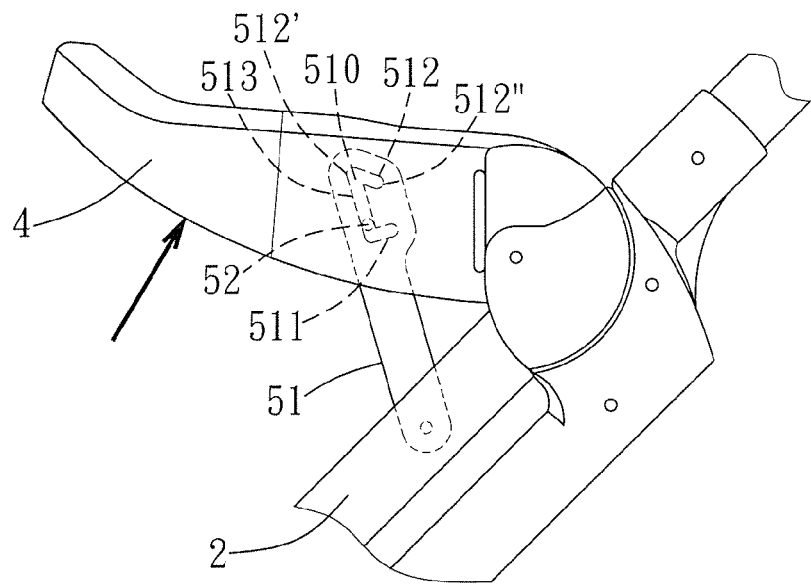
Figure 7:
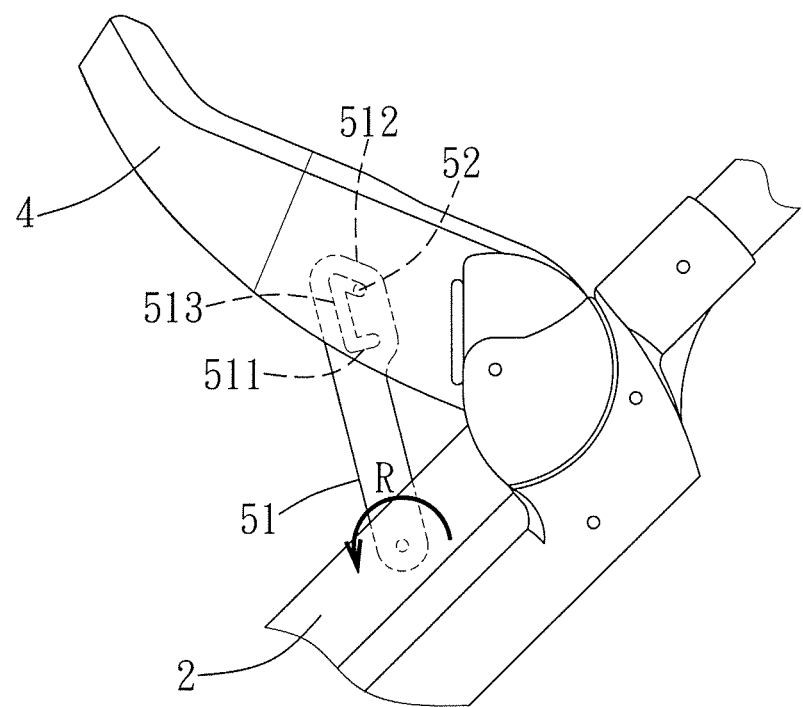

When the positioning member 52 is disposed in the closed end 511" of the first engagement portion 511, the support frame 4 is locked relative to the mounting frame portion 22 of the stroller frame 2. In this position, the support frame 4 is generally parallel to the ground surface, as shown in FIG. 1, so that the seat 3 is in the inclined position. As such, the child can sleep comfortably in the seat 3. When an external force (A) (see FIG. 5) is applied to move the positioning member 52 from the closed end 511" into the open end 511' against the biasing action of the torsion spring 531, the positioning member 52 is released from the first engagement portion 511 so that the support frame 4 is released from the stroller frame 2. Hence, the support frame 4 can be pivoted upwardly relative to the stroller frame 2 to thereby move the positioning member 52 toward the second engagement portion 512 along the lengthwise slot portion 513 of the slot 510, as shown in FIG. 6. When the positioning member 52 reaches the open end 512' of the second engagement portion 512, the supporting member 51 is biased by the torsion spring 531 to pivot relative to the stroller frame 2 in the rotational direction (R) to thereby move the positioning member 52 from the open end 512' of the second engagement portion 512 to the closed end 512" of the second engagement portion 512, as shown in FIG. 7. Hence, the positioning member 52 is locked at the second engagement portion 512 so that the support frame 4 is locked relative to the stroller frame 2. As such, the seat 3 is in the upright position, and the child is able to see the surroundings, and to interact with the person pushing the stroller 1 and taking care of the child. As a result, the angle between the support frame 4 and the mounting frame portion 22 and the inclination angle of the seat 3 can be adjusted.

Figure 8:
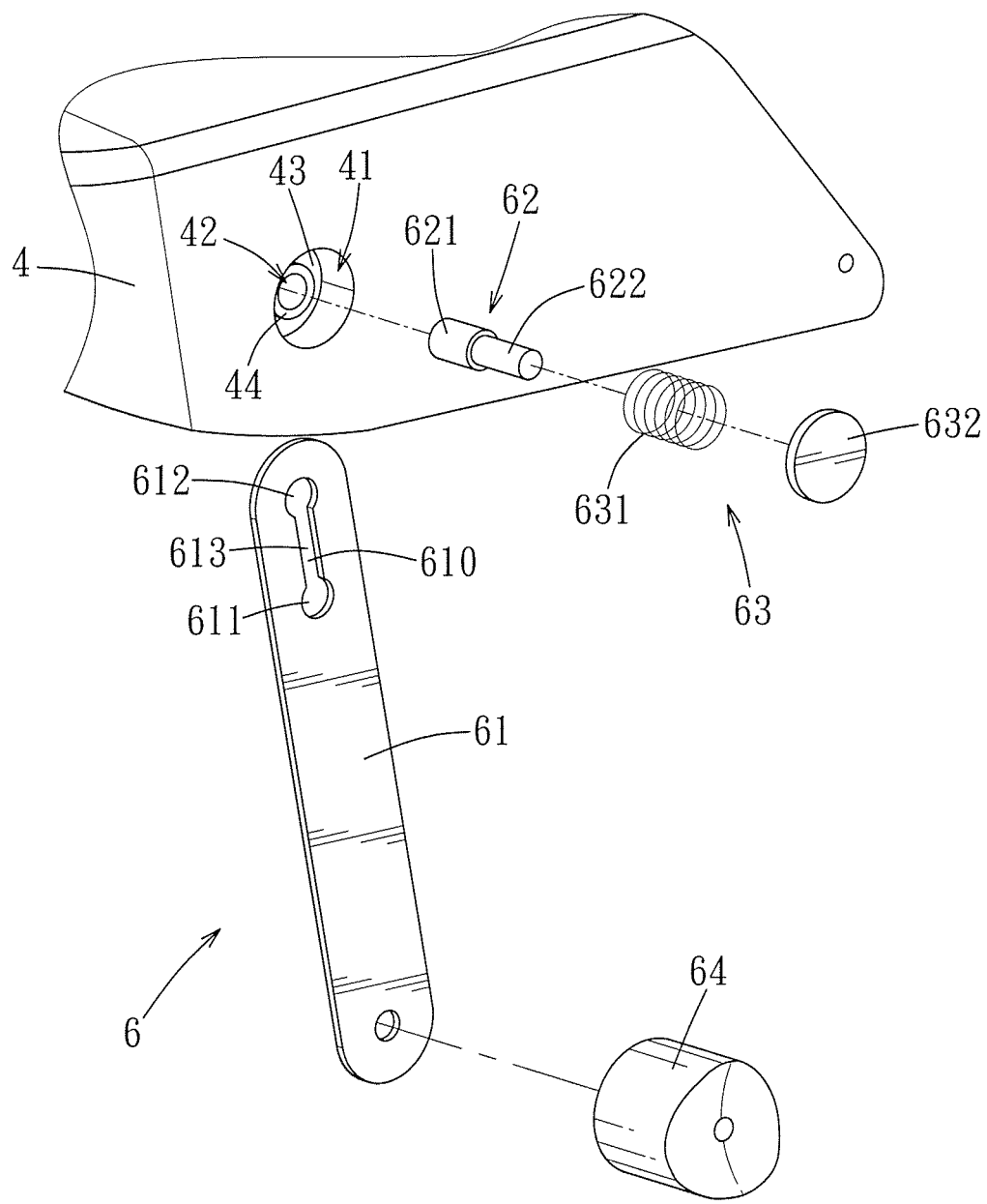
FIG. 8 is an exploded perspective view of a support-frame adjusting device of the second preferred embodiment of a stroller according to this invention.
Figure 9:
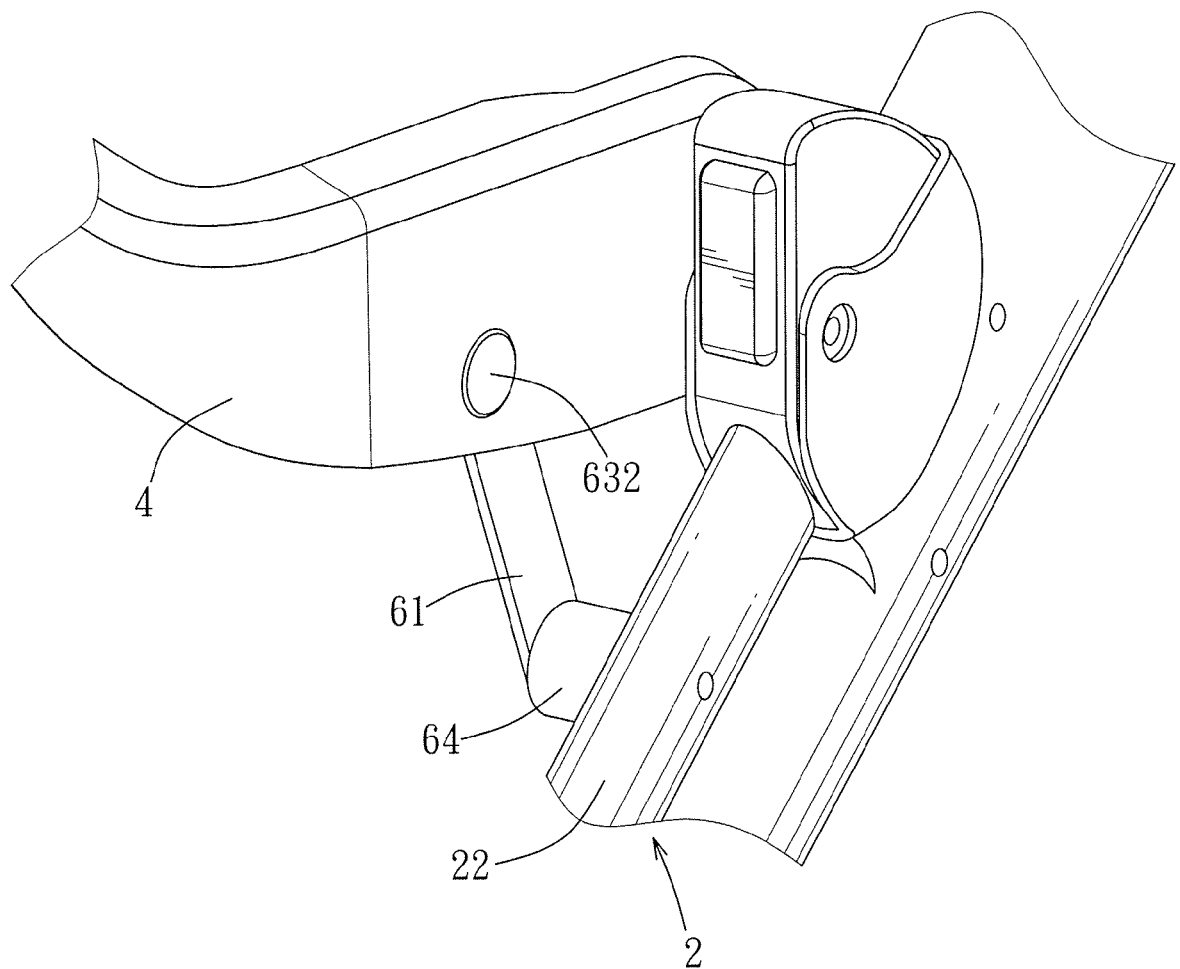
FIG. 9 is an assembled perspective view of the support-frame adjusting device of the second preferred embodiment.
Figure 10:
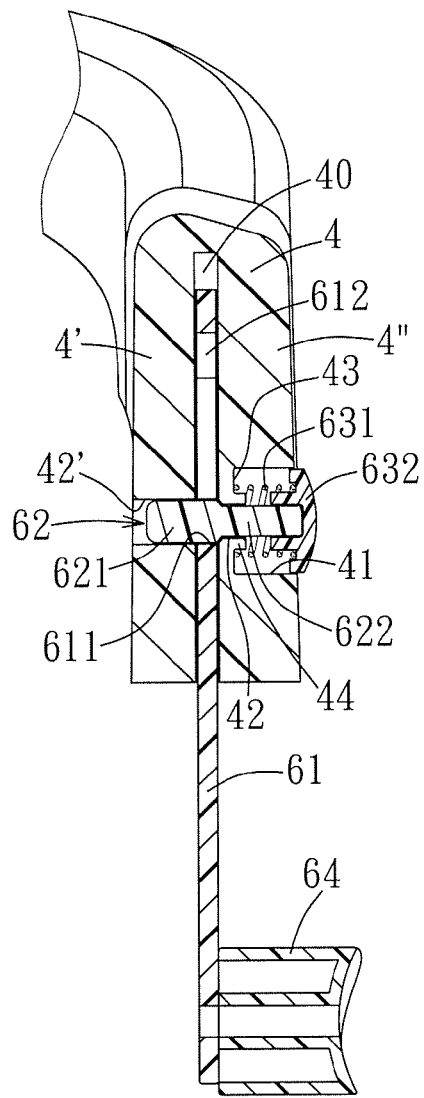
FIGS. 10 to 12 are schematic views illustrating operation of the support-frame adjusting device of the second preferred embodiment.

FIGS. 8, 9, and 10 show the second preferred embodiment of a stroller 1 according to this invention, which is similar in construction to the first preferred embodiment except that this invention includes a first modified support-frame adjusting device 6. The first modified support-frame adjusting device 6 includes a supporting member 61, a positioning member 62, and a resilient unit 63. The supporting member 61 is elongated, and has a lower end disposed pivotally on the mounting frame portion 22 of the stroller frame 2, and an upper end extending into a blind hole 40 in the support frame 4. The supporting member 61 is formed with a straight slot 610 that has a round lower end or first retaining slot portion 611 constituting the first engagement portion, a round upper end or second retaining slot portion 612 constituting the second engagement portion and having a diameter the same as that of the first retaining slot portion 611, and an intermediate slot portion 613 connected between the first and second retaining slot portions 611, 612 and having a width smaller than the diameter of the first and second retaining slot portions 611, 612.

Figure 11:
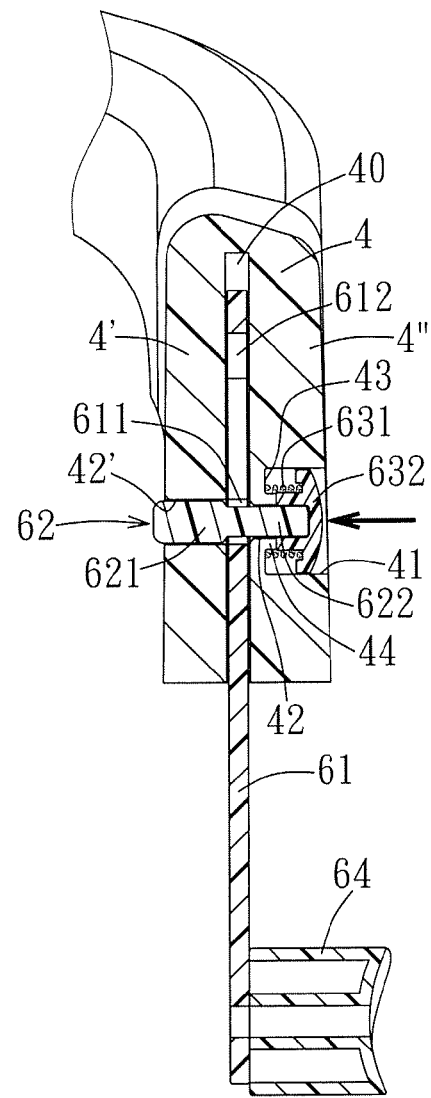
Figure 12:
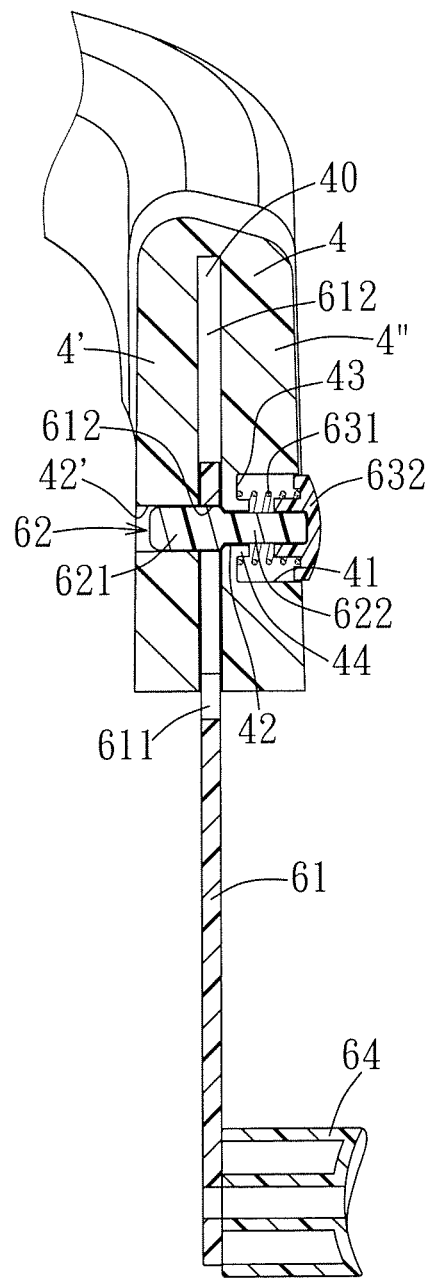

In this embodiment, the positioning member 62 has a large-diameter section 621 having a diameter slightly smaller than that of the first retaining slot portion 611 and the second retaining slot portion 612, and a small-diameter section 622 connected to the large-diameter section 621 and having a diameter slightly smaller than the width of the intermediate slot portion 614. As such, the large-diameter section 621 of the positioning member 62 is engageable fittingly within the first retaining slot portion 611 or the second retaining slot portion 612, and is not able to move into the intermediate slot portion 613. The small-diameter section 622 is movable within the intermediate slot portion 613. The blind hole 40 divides the support frame 4 into an inner wall body 4' and an outer wall body 4". The outer wall body 4" of the support frame 4 has a side surface formed with a cavity 41. The cavity 41 is defined by a bottom wall 43, which has a central portion formed with an outer hole 42 therethrough. The bottom wall 43 is formed with an annular rib 44 (see FIGS. 10 to 12) disposed around the outer hole 42 and extending into the cavity 41. The inner wall body 4' of the support frame 4 has an inner hole 42' formed therethrough and aligned with the outer hole 42. The inner hole 42' has a diameter larger than that of the outer hole 42. The large-diameter section 621 of the positioning member 62 is disposed within the inner hole 42'. The small-diameter section 622 extends through the outer hole 42 and the cavity 41.

The resilient unit 63 is disposed within the cavity 41, and includes a coiled compression spring 631 sleeved on the annular rib 44, and a pushbutton 632 sleeved fixedly on an end of the small-diameter section 622 of the positioning member 62 distal from the large-diameter section 621. The compression spring 631 has one end abutting against the bottom wall 43, and the other end abutting against the pushbutton 632.

When the large-diameter section 621 of the positioning member 62 is disposed within the first retaining hole portion 611 (i.e., the first engagement portion), since the width of the intermediate slot portion 613 is smaller than the diameter of the large-diameter section 621 of the positioning member 62, the supporting member 61 cannot move relative to the support frame 4. As such, the supporting member 61 is locked relative to the support frame 4. In other words, the support frame 4 is locked relative to the stroller frame 2.

When an external force is applied in a direction (shown by the arrow in FIG. 11) to press the pushbutton 632 of the resilient unit 63, the compression spring 631 is compressed, and the pushbutton 632 and the positioning member 62 are moved within the support frame 4 in a direction away from the cavity 41. Hence, the large-diameter section 621 of the positioning member 62 is removed from the first retaining slot portion 611, and the small-diameter section 622 of the positioning member 62 is moved into the first retaining slot portion 611 to thereby release the positioning member 62 from the first retaining slot portion 611. At this time, the support frame 4 can be moved upwardly relative to the supporting member 61 until the positioning member 62 moves into the second retaining slot portion 612 through the intermediate slot portion 613.

When the external force is released, the compression spring 631 of the resilient unit 63 provides a biasing force to move the large-diameter 621 of the positioning member 62 into the second retaining slot portion 612 in a direction toward the cavity 41, thereby converting the positioning member 62 into a locked state. Hence, the position of the support frame 4 is moved upwardly relative to the stroller frame 2 to thereby change the angle between the support frame 4 and the mounting frame portion 22 of the stroller frame 2.

Figure 13:
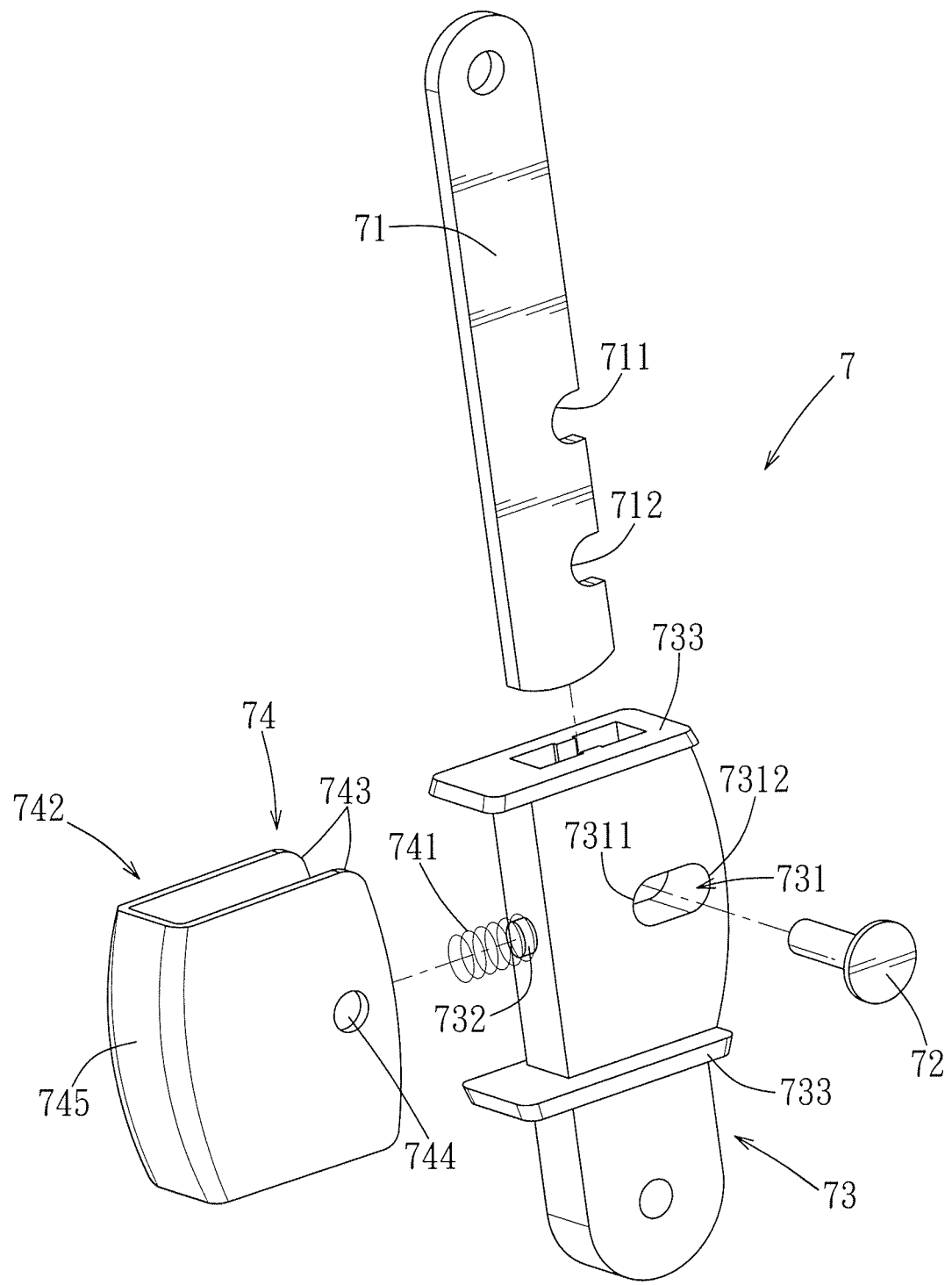
FIG. 13 is an exploded perspective view of a support-frame adjusting device of the third preferred embodiment of a stroller according to this invention.
Figure 14:
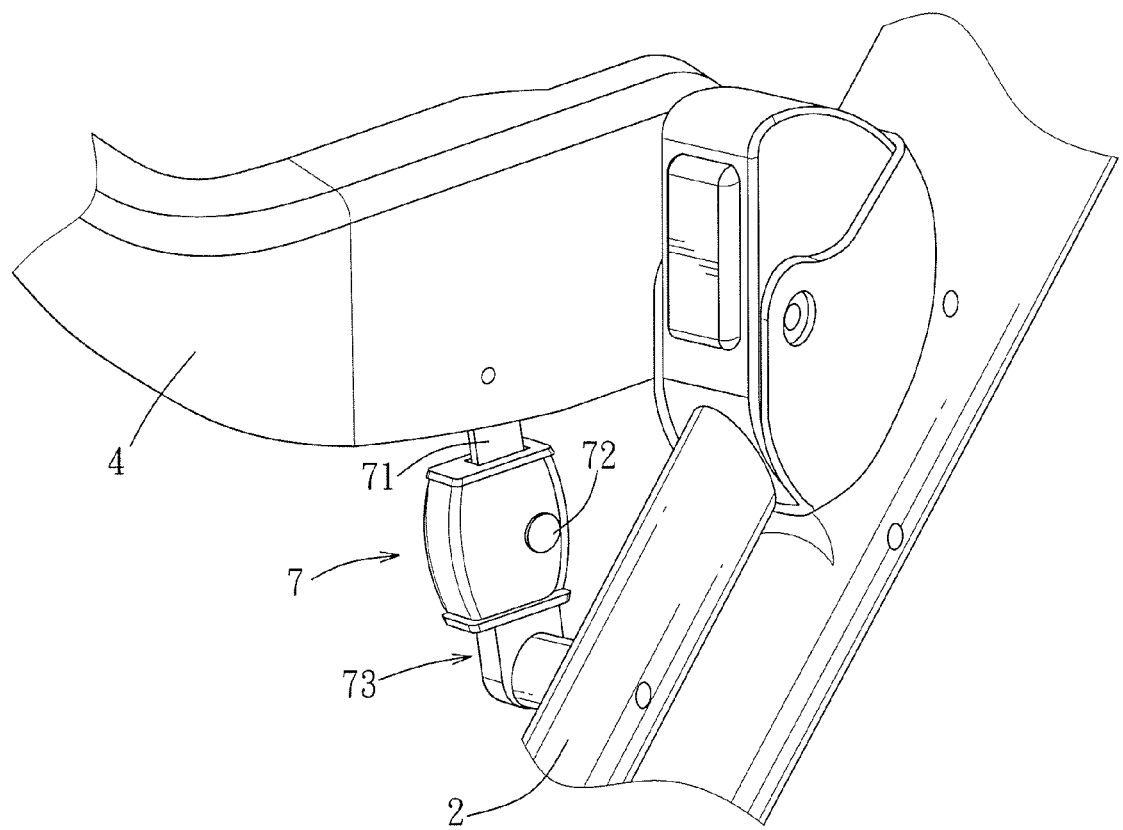
FIG. 14 is an assembled perspective view of the support-frame adjusting device of the third preferred embodiment.
Figure 15:
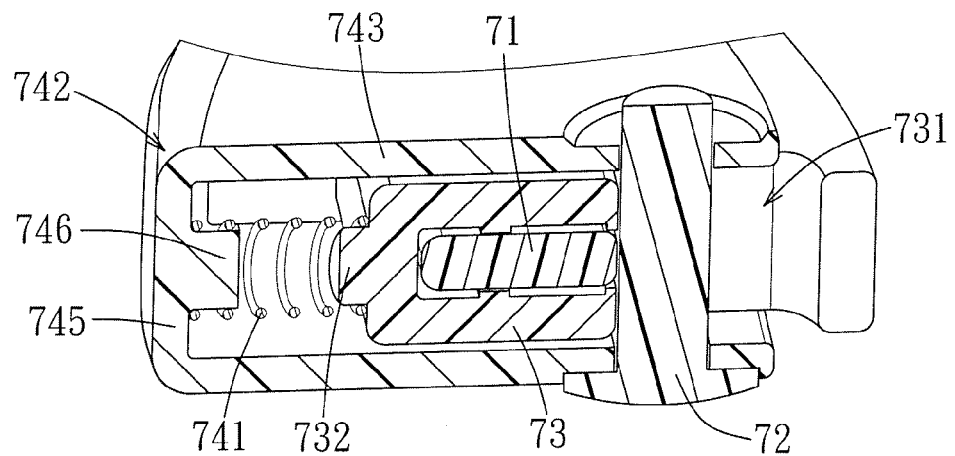
FIG. 15 is a sectional view of the support-frame adjusting device of the third preferred embodiment.
Figure 16:
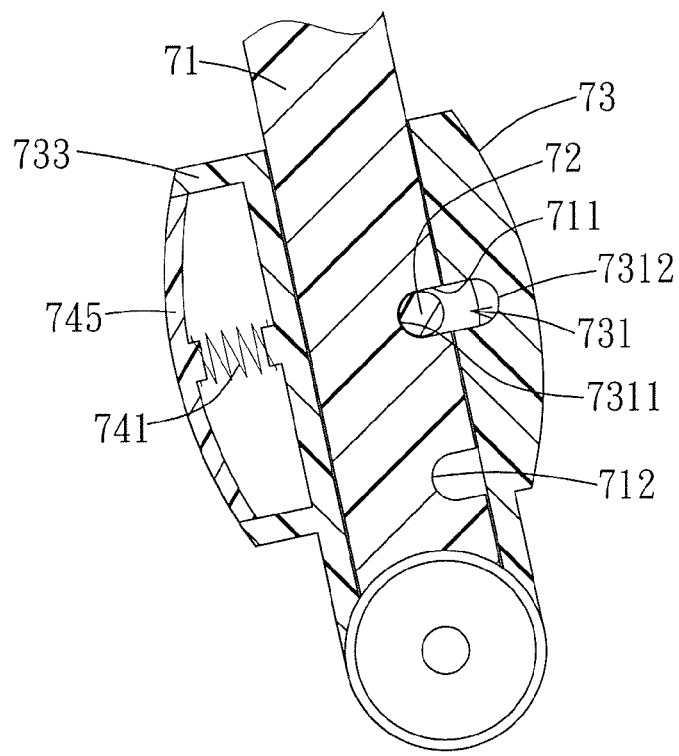
FIGS. 16 to 18 are schematic views illustrating operation of the support-frame adjusting device of the third preferred embodiment.
Figure 17:
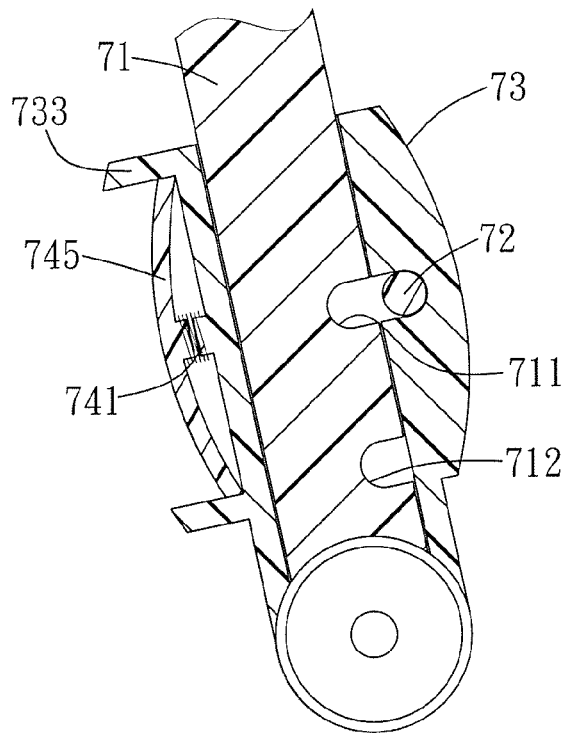
Figure 18:
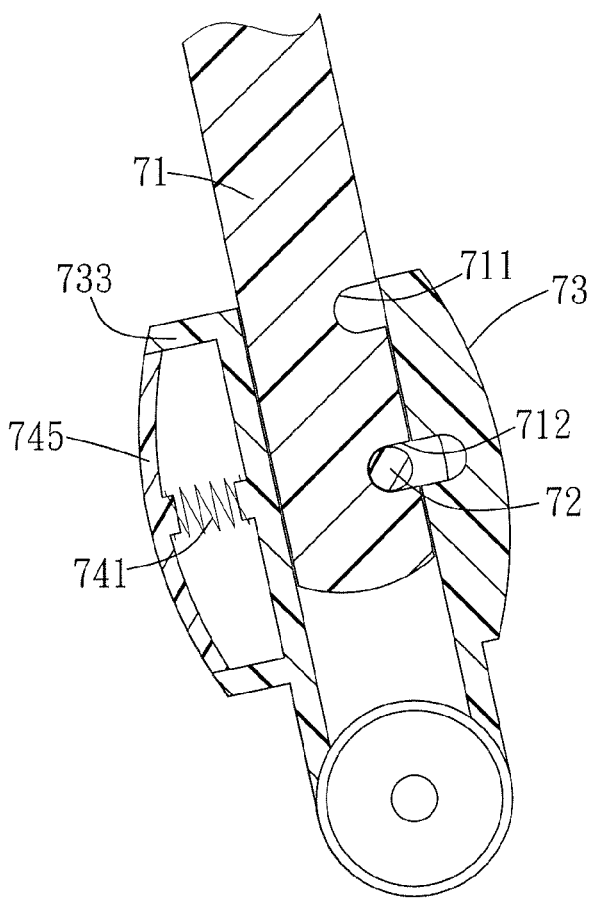

FIGS. 13, 14, and 15 show the third preferred embodiment of a stroller 1 according to this invention, which is similar in construction to the first preferred embodiment except that this invention includes a second modified support-frame adjusting device 7. The second modified support-frame adjusting device 7 includes a supporting member 71, a positioning member 72, a hollow sliding sleeve 73, and a resilient unit 74.

The supporting member 71 has an upper end mounted pivotally to the support frame 4. The sliding sleeve 73 is fixed on the mounting frame portion 22 of the stroller frame 2, and extends toward the support frame 4. The supporting member 71 extends downwardly and slidably into the sliding sleeve 73, and has a first engagement portion 711 and a second engagement portion 712 disposed below the first engagement portion 711. The first and second engagement portions 711, 712 are configured respectively as two notches that are formed in a side of the supporting member 71. The sliding sleeve 73 is formed with a slot 731 adjacent to the first and second engagement portions 711, 712 and permitting extension of the positioning member 72. The slot 731 extends in a direction perpendicular to the longitudinal direction of the supporting member 71.

The resilient unit 74 includes a coiled compression spring 741 and a pushbutton 742. The pushbutton 742 is U-shaped in cross-section, and has two side plates 743 flanking the sliding sleeve 73, two aligned mounting holes 744 formed respectively through the side plates 743, and a pressing portion 745 interconnecting the side plates 743. The positioning member 72 extends through the mounting holes 744 in the side plates 743 and the slot 731. Since the positioning member 72 engages fittingly the mounting holes 744 in the side plates 743, it cannot move relative to the pushbutton 742. The compression spring 741 has two ends abutting respectively against the pressing portion 745 of the pushbutton 742 and the sliding sleeve 73. To confine the compression spring 741 between the sliding sleeve 73 and the pushbutton 74, two positioning stubs 732, 746 are formed respectively on the sliding sleeve 73 and the pushbutton 74 so as to permit the ends of the compression spring 741 to be sleeved respectively thereon. To limit the pushbutton 742 to move on the sliding sleeve 73 in a direction, two position-limiting plates 733 are provided on the sliding sleeve 73 in such a manner to confine the side plates 743 of the pushbutton 743 therebetween.

Referring to FIGS. 13, 16, 17, and 18, the slot 731 has a first end 7311 proximate to the compression spring 741 of the resilient unit 74, and a second end 7312 opposite to the first end 7311 and distal from the compression spring 741. When the positioning member 72 is located at the first end 7311 of the slot 731 and in the first engagement portion 711 of the supporting member 71, it is locked on the sliding sleeve 73, thereby preventing pivoting movement of the support frame 4 relative to the mounting frame portion 22 of the stroller frame 2. When an external force is applied to move the positioning member 72 from the first end 7311 of the slot 73 into the second end 7312 of the slot 731, the positioning member 72 is removed from the first engagement portion 711, so that the supporting member 71 is released from the sliding sleeve 73, thereby allowing for pivoting movement of the support frame 4 relative to the mounting frame portion 22 of the stroller frame 2. At this time, the support frame 4 can be moved upwardly relative to the sliding sleeve 73 to a position aligned with the second engagement portion 712 of the supporting member 71.

Subsequently, when the force is released, the positioning member 72 is biased by the compression spring 741 to move into the second engagement portion 712 and the first end 7311 of the slot 73. Hence, the positioning member 72 is maintained within the second engagement portion 712 due to the biasing force of the compression spring 741. Movement of the positioning member 72 from the first engagement portion 711 to the second engagement portion 712 results in a change to the angle between the side arm 41 of the support frame 4 and the mounting frame portion 22 of the stroller frame 2 and, thus, the inclination angle of the car safety seat 3.

In view of the above, by operating easily the support-frame adjusting device 5, 6, 7 of the stroller 1, the inclination angle of the car seat 3 can be adjusted. Thus, the objects of this invention are achieved.

With this invention thus explained, it is apparent that numerous modifications and variations can be made without departing from the scope and spirit of this invention. It is therefore intended that this invention be limited only as indicated by the appended claims.

I claim:

1. A stroller adapted to be connected with a seat, said stroller comprising:
    a stroller frame having a mounting frame portion;
    a support frame connected pivotally to said mounting frame portion of said stroller frame and adapted to permit the seat to be mounted removably thereon; and
    a support-frame adjusting device operable to adjust an angle between said support frame and said mounting frame portion of said stroller frame and including:
    an elongated supporting member disposed pivotally on one of said support frame and said mounting frame portion and having a first engagement portion and a second engagement portion that are spaced apart from each other along a longitudinal direction of said supporting member, and
    a positioning member removably engaging a selected one of said first and second engagement portions of said supporting member;
    wherein, when released from the selected one of said first and second engagement portions of said supporting member, said positioning member is movable to and thus locked releaseably at the other one of said first and second engagement portions of said positioning member to change the angle between said supporting member and said mounting frame portion and, thus, the inclination angle of the seat.

2. The stroller as claimed in claim 1, wherein each of said first and second engagement portions of said supporting member of said support-frame adjusting device is elongated, and has an open end and a closed end that are opposite to each other, said open and closed ends of said first engagement portion being aligned respectively with those of said second engagement portion such that, when locked at the selected one of said first and second engagement portions, said positioning member is disposed at said closed end of the selected one of said first and second engagement portions, and when released from the selected one of said first and second engagement portions, said positioning member is disposed at said open end of the selected one of said first and second engagement portions.

3. The stroller as claimed in claim 2, wherein said supporting member of said support-frame adjusting device is formed with a generally U-shaped slot therethrough, said U-shaped slot having a pair of first and second side slot portions constituting respectively said first and second engagement portions, and a lengthwise slot portion connected between said open ends of said first and second engagement portions.

4. The stroller as claimed in claim 3, wherein said supporting member of said support-frame adjusting device has a lower end disposed pivotally on said mounting frame portion of said stroller frame, and an upper end extending into said support frame, said first and second engagement portions being located at an upper end portion of said supporting member such that said first engagement portion is disposed below said second engagement portion, said positioning member extending through the selected one of said first and second engagement portions such that, when an external force is applied to move said positioning member to said open end of the selected one of said first and second engagement portions, said positioning member is released from the selected one of said first and second engagement portions, and is movable to engage the other of said first and second engagement portions.

5. The stroller as claimed in claim 4, wherein said support-frame adjusting device further includes a resilient unit, said resilient unit including a torsion spring disposed between said lower end of said supporting member and said mounting frame portion of said stroller frame for biasing said positioning member into said closed end of the selected one of said first and second engagement portions.

6. The stroller as claimed in claim 5, wherein said resilient unit further includes a hollow spring seat disposed fixedly on said mounting frame portion for receiving said torsion spring, and an end cap disposed fixedly on said lower end of said supporting member, said torsion spring having one end fastened to said spring seat, and the other end fastened to said end cap.

7. The stroller as claimed in claim 1, wherein said supporting member of said support-frame adjusting device is formed with a straight slot therethrough, said straight slot having two retaining slot portions disposed respectively at two opposite ends thereof and constituting respectively said first and second engagement portions, and an intermediate slot portion connected between said retaining slot portions and permitting said positioning member to move from one of said retaining slot portions into the other of said retaining slot portions therethrough.

8. The stroller as claimed in claim 7, wherein said retaining slot portions of said slot have a diameter larger than a width of said intermediate slot portion, and said positioning member has a large-diameter section movable to engage fittingly a selected one of said retaining slot portions so that said positioning member is locked within the selected one of said retaining slot portions, and a small-diameter section connected to said large-diameter section such that, when an external force is applied to said positioning member in a direction to remove said large-diameter section of said positioning member from the selected one of said retaining slot portions, said small-diameter section of said positioning member can be moved into the other of said retaining slot portions via said intermediate slot portion, after which, upon release of the external force, said large-diameter section of said positioning member is biased to move into said large-diameter slot portion in an opposite direction, thereby locking said positioning member therein.

9. The stroller as claimed in claim 8, wherein said supporting member of said support-frame adjusting device has a lower end disposed pivotally on said mounting frame portion of said stroller frame, and an upper end extending into said support frame, said first and second engagement portions being located at an upper end portion of said supporting member, said slot being straight, said positioning member extending into said support frame and through the selected one of said first and second engagement portions of said supporting member.

10. The stroller as claimed in claim 9, wherein said support-frame adjusting device further includes a spring for biasing said large-diameter section of said positioning member into the selected one of said first and second engagement portions of said supporting member.

11. The stroller as claimed in claim 10, wherein said support frame has a side surface formed with a cavity, said small-diameter section of said positioning member extending into said cavity, said resilient unit further including a pushbutton disposed within said cavity and sleeved fixedly on an end of said small-diameter section of said positioning member distal from said large-diameter, said spring being disposed within said cavity and having one end abutting against a bottom wall defining said cavity, and the other end abutting against said pushbutton such that, when said pushbutton is pressed, said positioning member is moved within said support member in a direction away from said cavity to remove said large-diameter section of said positioning member from the selected one of said first and second engagement portions, and when said pushbutton is released, said positioning member is moved within said support member in a direction toward said cavity to engage said large-diameter section of said positioning member within the selected one of said first and second engagement portions.

12. The stroller as claimed in claim 1, wherein said support-frame adjusting device further includes a sliding sleeve fixed on said mounting frame portion of said stroller frame and extending toward said support frame, said supporting member having an upper end mounted pivotally to said support frame and extending downwardly and slidably into said sliding sleeve, said positioning member being mounted on said sliding sleeve.

13. The stroller as claimed in claim 12, wherein said first and second engagement portions are configured respectively as two notches that are formed in a side of said supporting member, said sliding sleeve being formed with a slot disposed adjacent to said first and second engagement portions and permitting extension of said positioning member therethrough, said slot having opposite first and second ends and extending along a direction perpendicular to said longitudinal direction of said supporting member, said positioning member being locked at the selected one of said first and second engagement portions when located at said first end of said slot, said positioning member being operable to move into said second end of said slot so as to allow for relative movement between said supporting member and said sliding sleeve and, thus, an adjustment to said angle between said support frame and said mounting frame portion of said stroller frame.

14. The stroller as claimed in claim 13, wherein said support-frame adjusting device further includes a resilient unit mounted on said sliding sleeve, said resilient unit including a spring disposed on said sliding sleeve for biasing said positioning member into said first end of said slot.

15. The stroller as claimed in claim 14, wherein said resilient unit of said support-frame adjusting device further includes a pushbutton having a U-shaped cross-section, two side plates flanking said sliding sleeve, and a pressing portion interconnecting said side plates, said positioning member extending through said side plates of said pushbutton, said spring having two opposite ends abutting respectively against said pressing portion of said pushbutton and said sliding sleeve such that, when said pressing portion of said pushbutton is pressed, said positioning member is pushed and moved into said second end of said slot.

16. The stroller as claimed in claim 1, wherein said support-frame adjusting device further includes a resilient unit for biasing said positioning member into the selected one of said first and second engagement portions of said supporting member.

17. The stroller as claimed in claim 1, wherein the seat comprises a car safety seat.

18. The stroller as claimed in claim 1, wherein the support frame comprises an armrest.

19. A support-frame adjusting device adapted to adjust an angle between a support frame and a mounting frame portion of a stroller frame, the support frame being connected pivotally to the mounting frame portion, said support-frame adjusting device comprising:
an elongated supporting member disposed pivotally on one of the support frame and the mounting frame portion and having a first engagement portion and a second engagement portion that are spaced apart from each other along a longitudinal direction of said supporting member, and
a positioning member removably engaging a selected one of said first and second engagement portions of said supporting member;
wherein, when released from the selected one of said first and second engagement portions of said supporting member, said positioning member is movable to and thus locked releaseably at the other one of said first and second engagement portions of said positioning member to change the angle between said supporting member and the mounting frame portion.

20. The support-frame adjusting device as claimed in claim 19, wherein each of said first and second engagement portions of said supporting member of said support-frame adjusting device is elongated, and has an open end and a closed end that are opposite to each other, said open and closed ends of said first engagement portion being aligned respectively with those of said second engagement portion such that, when locked at the selected one of said first and second engagement portions, said positioning member is disposed at said closed end of the selected one of said first and second engagement portions, and when released from the selected one of said first and second engagement portions, said positioning member is disposed at said open end of the selected one of said first and second engagement portions.

21. The support-frame adjusting device as claimed in claim 20, wherein said supporting member of said support-frame adjusting device is formed with a generally U-shaped slot therethrough, said U-shaped slot having a pair of first and second side slot portions constituting respectively said first and second engagement portions, and a lengthwise slot portion connected between said open ends of said first and second engagement portions.

22. The support-frame adjusting device as claimed in claim 21, wherein said supporting member of said support-frame adjusting device has a lower end disposed pivotally on the mounting frame portion of the stroller frame, and an upper end extending into the support frame, said first and second engagement portions being located at an upper end portion of said supporting member such that said first engagement portion is disposed below said second engagement portion, said positioning member extending through the selected one of said first and second engagement portions such that, when an external force is applied to move said positioning member to said open end of the selected one of said first and second engagement portions, said positioning member is released from the selected one of said first and second engagement portions, and is movable to engage the other of said first and second engagement portions.

23. The support-frame adjusting device as claimed in claim 22, wherein said support-frame adjusting device further includes a resilient unit, said resilient unit including a torsion spring disposed between said lower end of said supporting member and the mounting frame portion of the stroller frame for biasing said positioning member into said closed end of the selected one of said first and second engagement portions.

24. The support-frame adjusting device as claimed in claim 23, wherein said resilient unit further includes a hollow spring seat disposed fixedly on the mounting frame portion for receiving said torsion spring, and an end cap disposed fixedly on said lower end of said supporting member, said torsion spring having one end fastened to said spring seat, and the other end fastened to said end cap.

25. The support-frame adjusting device as claimed in claim 19, wherein said supporting member of said support-frame adjusting device is formed with a straight slot therethrough, said straight slot having two retaining slot portions disposed respectively at two opposite ends thereof and constituting respectively said first and second engagement portions, and an intermediate slot portion connected between said retaining slot portions and permitting said positioning member to move from one of said retaining slot portions into the other of said retaining slot portions therethrough.

26. The support-frame adjusting device as claimed in claim 19, wherein said retaining slot portions of said slot have a diameter larger than a width of said intermediate slot portion, and said positioning member has a large-diameter section movable to engage fittingly a selected one of said retaining slot portions so that said positioning member is locked within the selected one of said retaining slot portions, and a small-diameter section connected to said large-diameter section such that, when an external force is applied to said positioning member in a direction to remove said large-diameter section of said positioning member from the selected one of said retaining slot portions, said small-diameter section of said positioning member can be moved into the other of said retaining slot portions via said intermediate slot portion, after which, upon release of the external force, said large-diameter section of said positioning member is biased to move into said large-diameter slot portion in an opposite direction, thereby locking said positioning member therein.

27. The support-frame adjusting device as claimed in claim 26, wherein said supporting member of said support-frame adjusting device has a lower end disposed pivotally on the mounting frame portion of the stroller frame, and an upper end extending into the support frame, said first and second engagement portions being located at an upper end portion of said supporting member, said slot being straight, said positioning member extending into the support frame and through the selected one of said first and second engagement portions of said supporting member.

28. The support-frame adjusting device as claimed in claim 27, wherein said support-frame adjusting device further includes a spring for biasing said large-diameter section of said positioning member into the selected one of said first and second engagement portions of said supporting member.

29. The support-frame adjusting device as claimed in claim 28, wherein the support frame has a side surface formed with a cavity, said small-diameter section of said positioning member extending into said cavity, said resilient unit further including a pushbutton disposed within said cavity and sleeved fixedly on an end of said small-diameter section of said positioning member distal from said large-diameter, said spring being disposed within said cavity and having one end abutting against a bottom wall defining said cavity, and the other end abutting against said pushbutton such that, when said pushbutton is pressed, said positioning member is moved away from said cavity to remove said large-diameter section of said positioning member from the selected one of said first and second engagement portions, and when said pushbutton is released, said positioning member is moved toward said cavity to engage said large-diameter section of said positioning member within the selected one of said first and second engagement portions.

30. The support-frame adjusting device as claimed in claim 19, wherein said support-frame adjusting device further includes a sliding sleeve fixed on the mounting frame portion of the stroller frame and extending toward the support frame, said supporting member having an upper end mounted pivotally to the support frame and extending downwardly and slidably into said sliding sleeve, said positioning member being mounted on said sliding sleeve.

31. The support-frame adjusting device as claimed in claim 30, wherein said first and second engagement portions are configured respectively as two notches that are formed in a side of said supporting member, said sliding sleeve being formed with a slot disposed adjacent to said first and second engagement portions and permitting extension of said positioning member, said slot having opposite first and second ends and extending along a direction perpendicular to said longitudinal direction of said supporting member, said positioning member being locked at the selected one of said first and second engagement portions when located at said first end of said slot, said positioning member being operable to move into said second end of said slot so as to allow for relative movement between said supporting member and said sliding sleeve and, thus, an adjustment to said angle between the support frame and the mounting frame portion of the stroller frame.

32. The support-frame adjusting device as claimed in claim 31, wherein said support-frame adjusting device further includes a resilient unit mounted on said sliding sleeve, said resilient unit including a spring disposed on said sliding sleeve for biasing said positioning member into said first end of said slot.

33. The support-frame adjusting device as claimed in claim 32, wherein said resilient unit of said support-frame adjusting device further includes a pushbutton having a U-shaped cross-section, two side plates flanking said sliding sleeve, and a pressing portion interconnecting said side plates, said positioning member extending through said side plates of said pushbutton, said spring having two opposite ends abutting respectively against said pressing portion of said pushbutton and said sliding sleeve such that, when said pressing portion of said pushbutton is pressed, said positioning member is pushed and moved into said second end of said slot.

34. The support-frame adjusting device as claimed in claim 19, wherein said support-frame adjusting device further includes a resilient unit for biasing said positioning member into the selected one of said first and second engagement portions of said supporting member.

35. The support-frame adjusting device as claimed in claim 19, wherein the support frame is adapted to permit a car safety seat to be mounted removably thereon.

36. The support-frame adjusting device as claimed in claim 19, wherein the support frame comprises an armrest.

* * * * *